United States Patent
Hasuike et al.

(10) Patent No.: US 9,552,044 B2
(45) Date of Patent: Jan. 24, 2017

(54) INFORMATION PROCESSING APPARATUS, INFORMATION PROCESSING SYSTEM, INFORMATION PROCESSING METHOD, AND NON-TRANSITORY COMPUTER READABLE MEDIUM

(75) Inventors: Kimitake Hasuike, Kanagawa (JP); Yasuhiro Hirano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 589 days.

(21) Appl. No.: 13/561,495

(22) Filed: Jul. 30, 2012

(65) Prior Publication Data
US 2013/0257902 A1    Oct. 3, 2013

(30) Foreign Application Priority Data
Mar. 30, 2012  (JP) ................................ 2012-081622

(51) Int. Cl.
*G09G 5/30*  (2006.01)
*G06F 1/32*  (2006.01)
*G06F 3/14*  (2006.01)

(52) U.S. Cl.
CPC .......... *G06F 1/3231* (2013.01); *G06F 3/1454* (2013.01); *G09G 2340/14* (2013.01);
(Continued)

(58) Field of Classification Search
CPC ...................................................... G06F 9/38
(Continued)

(56) References Cited

U.S. PATENT DOCUMENTS 7,782,795 B2 *  8/2010  Kawamura et al. .......... 370/254
2002/0196276 A1 * 12/2002  Corl ...................... G06F 9/4443
715/744

(Continued)

FOREIGN PATENT DOCUMENTS

JP    3-288262 A    12/1991
JP    2000-20464 A    1/2000
(Continued)

OTHER PUBLICATIONS

Communication dated Dec. 22, 2015 from the Japanese Patent Office in counterpart application No. 2012-081622.
(Continued)

*Primary Examiner* — Javid A Amini
(74) *Attorney, Agent, or Firm* — Sughrue Mion, PLLC

(57) ABSTRACT

An information processing apparatus includes a specifying unit, an identification information obtaining unit, a state information obtaining unit, a display setting obtaining unit, and a processing unit. The specifying unit specifies data displayed on a display screen. The identification information obtaining unit obtains identification information identifying an operator who performs an operation on the data on the display screen. The state information obtaining unit obtains state information representing a display state of an operation unit, which is used for performing an operation on the data on the display screen. The display setting obtaining unit obtains setting about display of the operation unit. The processing unit performs, when a predetermined storage operation of storing a display state of the operation unit is performed by the operator, a process of storing the state information in association with the specified data and the identification information.

15 Claims, 11 Drawing Sheets

(52) U.S. Cl.
CPC ... *G09G 2354/00* (2013.01); *G09G 2370/042* (2013.01); *Y02B 60/1289* (2013.01)

(58) Field of Classification Search
USPC ............................................... 345/619
See application file for complete search history.

(56) References Cited

U.S. PATENT DOCUMENTS

| | | | |
|---|---|---|---|
| 2003/0065406 A1* | 4/2003 | Hou ................................ | 700/11 |
| 2003/0069848 A1* | 4/2003 | Larson .................... | H04L 41/22 |
| | | | 705/50 |
| 2003/0144604 A1* | 7/2003 | Holmes et al. ................ | 600/561 |
| 2003/0169264 A1* | 9/2003 | Emerson et al. .............. | 345/547 |
| 2003/0227487 A1* | 12/2003 | Hugh .................... | G06F 17/30958 |
| | | | 715/777 |
| 2004/0059782 A1* | 3/2004 | Sivertsen ....................... | 709/204 |
| 2006/0075088 A1* | 4/2006 | Guo ........................ | H04L 67/02 |
| | | | 709/224 |
| 2006/0112078 A1* | 5/2006 | Betarbet et al. .................. | 707/3 |
| 2007/0067104 A1* | 3/2007 | Mays ............................ | 701/211 |
| 2008/0105746 A1* | 5/2008 | Lei ........................... | 235/462.11 |
| 2009/0122145 A1* | 5/2009 | Ono .............................. | 348/161 |
| 2009/0125796 A1* | 5/2009 | Day ..................... | G06F 9/4443 |
| | | | 715/219 |
| 2009/0144436 A1* | 6/2009 | Schneider ..................... | 709/229 |
| 2009/0307586 A1* | 12/2009 | Carter .................... | G06F 3/0481 |
| | | | 715/700 |
| 2010/0114614 A1* | 5/2010 | Sharpe ............................. | 705/5 |
| 2010/0281036 A1* | 11/2010 | Inoue et al. ................... | 707/749 |
| 2011/0151837 A1* | 6/2011 | Winbush, III .......... | H04W 8/22 |
| | | | 455/412.1 |
| 2011/0191303 A1* | 8/2011 | Kaufman .......... | G06F 17/30286 |
| | | | 707/684 |
| 2011/0219403 A1* | 9/2011 | Nesamoney et al. ........... | 725/34 |
| 2011/0295709 A1* | 12/2011 | Kubo et al. .................. | 705/26.1 |
| 2011/0314042 A1* | 12/2011 | Nuggehalli ........ | H04N 1/00244 |
| | | | 707/769 |
| 2012/0026519 A1* | 2/2012 | Yoshida ....................... | 358/1.11 |
| 2012/0057193 A1* | 3/2012 | Jazayeri et al. ............. | 358/1.15 |
| 2012/0081738 A1* | 4/2012 | Seki ............................. | 358/1.15 |
| 2012/0151439 A1* | 6/2012 | Demant .................... | G06F 8/38 |
| | | | 717/120 |
| 2012/0162713 A1* | 6/2012 | Minamiyama ............... | 358/1.15 |
| 2012/0265361 A1* | 10/2012 | Billingsley ............ | H04L 12/12 |
| | | | 700/295 |
| 2012/0268769 A1* | 10/2012 | Kashioka ..................... | 358/1.15 |
| 2012/0311306 A1* | 12/2012 | Mushano ...................... | 712/225 |
| 2013/0122934 A1* | 5/2013 | Branch et al. ............. | 455/456.3 |
| 2013/0163031 A1* | 6/2013 | Tanaka .......................... | 358/1.14 |
| 2013/0174077 A1* | 7/2013 | Asami et al. .................. | 715/771 |

FOREIGN PATENT DOCUMENTS

| | | |
|---|---|---|
| JP | 2003-186592 A | 7/2003 |
| JP | 2003-186671 A | 7/2003 |
| JP | 2012-3766 A | 1/2012 |

OTHER PUBLICATIONS

Japanese Unexamined Patent Application Publication No. 2003-186671.

* cited by examiner

FIG. 6

| DOCUMENT ID | USER ID | UI STATE |
|---|---|---|
| X | A | M1 |
| | B | M2 |
| | C | M3 |
| | ⋮ | ⋮ |
| Y | A | M4 |
| | B | M5 |
| | C | M6 |
| | ⋮ | ⋮ |
| Z | A | M7 |
| | B | M8 |
| | C | M9 |
| | ⋮ | ⋮ |

FIG. 10A

| MENU | APPARATUS A | | APPARATUS B | |
|---|---|---|---|---|
| | DISPLAY/HIDE | FORM | DISPLAY/HIDE | FORM |
| CHARACTER FORMAT | DISPLAY | DEFAULT | DISPLAY | APPARATUS |
| RULED LINE | DISPLAY | DEFAULT | DISPLAY | APPARATUS |
| DRAW | DISPLAY | DEFAULT | HIDE | – |
| ⋮ | ⋮ | | ⋮ | |

FIG. 10B

| MENU | ITEM | APPARATUS A | | APPARATUS B | |
|---|---|---|---|---|---|
| | | DISPLAY/HIDE | ORDER | DISPLAY/HIDE | ORDER |
| CHARACTER FORMAT | FONT | DISPLAY | 1 | DISPLAY | 2 |
| | FONT SIZE | DISPLAY | 2 | DISPLAY | 1 |
| | BOLD | DISPLAY | 3 | HIDE | – |
| | ITALIC | DISPLAY | 4 | HIDE | – |
| | UNDERLINE | DISPLAY | 5 | HIDE | – |
| | ⋮ | ⋮ | ⋮ | ⋮ | ⋮ |
| RULED LINE | TYPE OF LINE | DISPLAY | 1 | DISPLAY | 1 |
| | THICKNESS | DISPLAY | 2 | HIDE | – |
| | COLOR | DISPLAY | 3 | DISPLAY | 2 |
| | ⋮ | ⋮ | ⋮ | ⋮ | ⋮ |
| ⋮ | ⋮ | ⋮ | ⋮ | ⋮ | ⋮ |

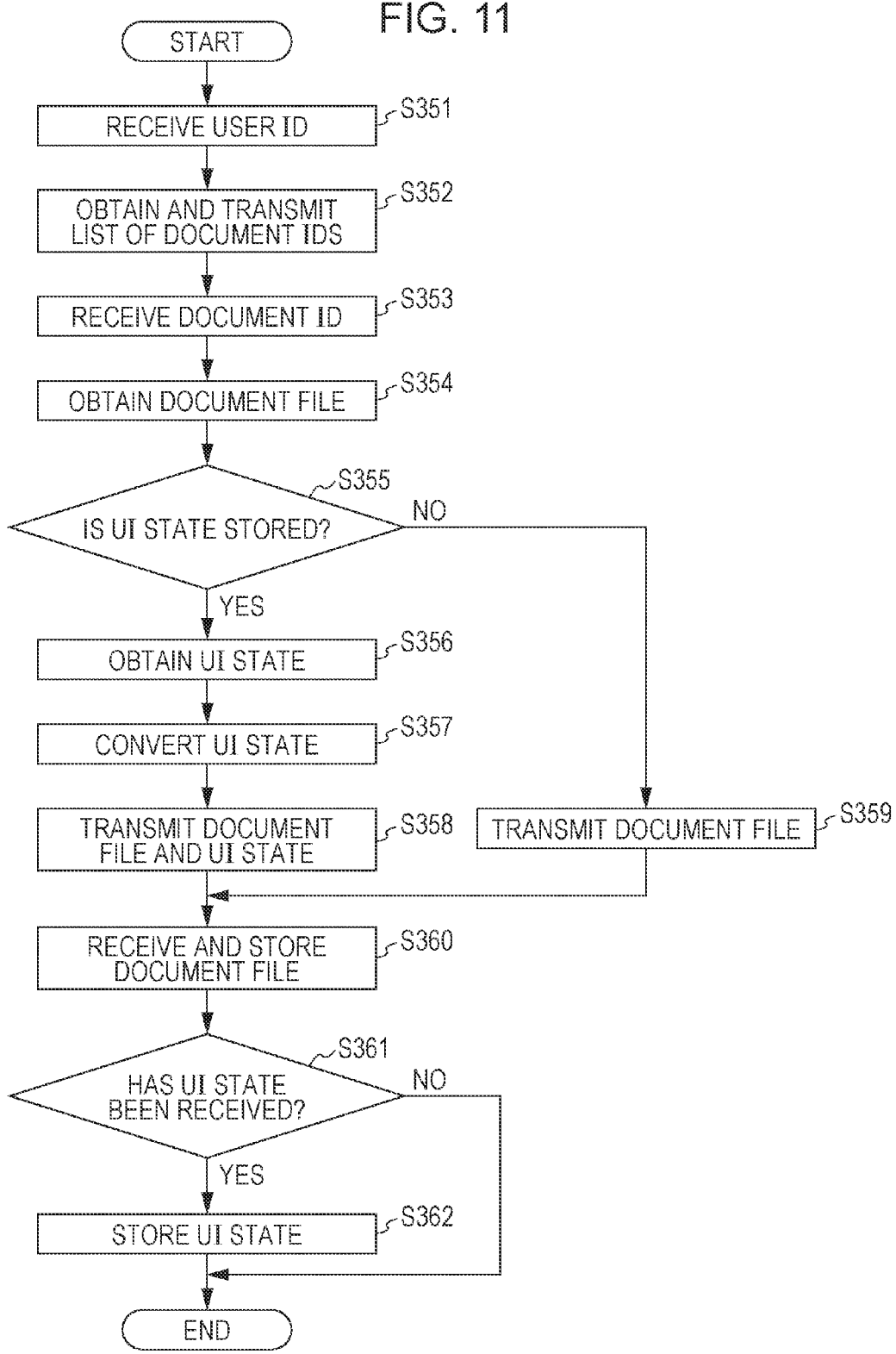

INFORMATION PROCESSING APPARATUS, INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-081622 filed Mar. 30, 2012.

BACKGROUND

Technical Field

The present invention relates to an information processing apparatus, an information processing system, an information processing method, and a non-transitory computer readable medium.

SUMMARY

According to an aspect of the invention, there is provided an information processing apparatus including a specifying unit, an identification information obtaining unit, a state information obtaining unit, a display setting obtaining unit, and a processing unit. The specifying unit specifies data displayed on a display screen. The identification information obtaining unit obtains identification information identifying an operator who performs an operation on the data on the display screen. The state information obtaining unit obtains state information representing a display state of an operation unit, which is used for performing an operation on the data on the display screen. The display setting obtaining unit obtains setting about display of the operation unit. The processing unit performs, when a predetermined storage operation of storing a display state of the operation unit is performed by the operator, a process of storing the state information obtained by the state information obtaining unit in association with the data specified by the specifying unit and the identification information obtained by the identification information obtaining unit.

BRIEF DESCRIPTION OF THE DRAWINGS

Exemplary embodiments of the present invention will be described in detail based on the following figures, wherein:

FIG. 6 is a diagram illustrating an example of detailed content of information stored in a UI state memory according to the first exemplary embodiment;

FIGS. 10A and 10B are diagrams illustrating an example of detailed content of information stored in an inheritance information memory according to the second exemplary embodiment; and FIG. 11 is a flowchart illustrating an example of operation of the document server according to the second exemplary embodiment.

DETAILED DESCRIPTION

Hereinafter, exemplary embodiments of the present invention will be described in detail with reference to the attached drawings.

Figure 1:
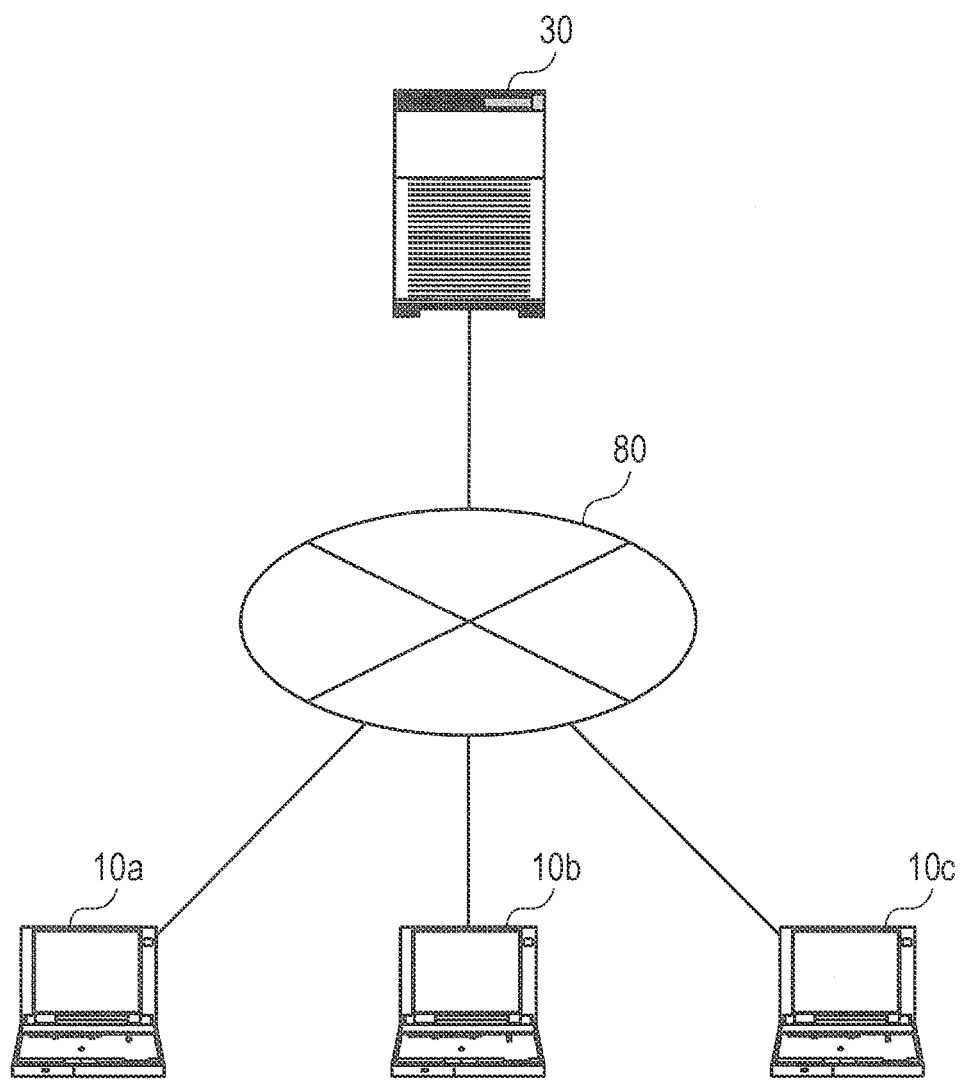
FIG. 1 is a diagram illustrating an example configuration of a computer system according to an exemplary embodiment of the present invention.

FIG. 1 illustrates an example configuration of an entire computer system according to an exemplary embodiment.

As illustrated in FIG. 1, the computer system includes client terminals 10a, 10b, and 10c and a document server 30, which are connected to one another via a network 80.

Each of the client terminals 10a, 10b, and 10c illustrated in FIG. 1 will be referred to as a client terminal 10 when it is not necessary to distinguish them from one another. Though three client terminals 10 are illustrated in FIG. 1, four or more client terminals 10 may be provided.

Each of the client terminals 10 is a computer apparatus that is used by a user to, for example, view or edit a document file. Specifically, the client terminal 10 downloads a document file from the document server 30, allows a user to view or edit the document file, and then uploads the document file to the document server 30, in response to a user operation. Here, examples of the client terminal 10 include a desktop personal computer (PC), a notebook PC, a tablet PC, a wearable computer, a personal digital assistant (PDA), a smart phone, and a mobile phone. In this exemplary embodiment, the client terminal 10 is provided as an example of a first operation apparatus and a second operation apparatus.

The document server 30 is a computer apparatus that stores a document file on which a user performs viewing, editing, etc. Specifically, the document server 30 stores a file created by using word processor software, spreadsheet software, presentation software, or the like, or a file in a portable document format (PDF) in which an original image may be reproduced without depending on the viewing environment. Note that, in this specification, a "document file" is not always a file generated by digitalizing a "document" including text. For example, graphic data of figures or the like, and image data of pictures, photos, or the like may also be included in a "document file" regardless of whether the data is raster data or vector data. Here, a PC or the like may be used as the document server 30. In this exemplary embodiment, the document server 30 is provided as an example of a management apparatus.

The network 80 is a communication medium used for information communication performed between each of the client terminals 10 and the document server 30, and is the Internet, for example.

Next, a hardware configuration of the client terminal 10 will be described.

Figure 2:
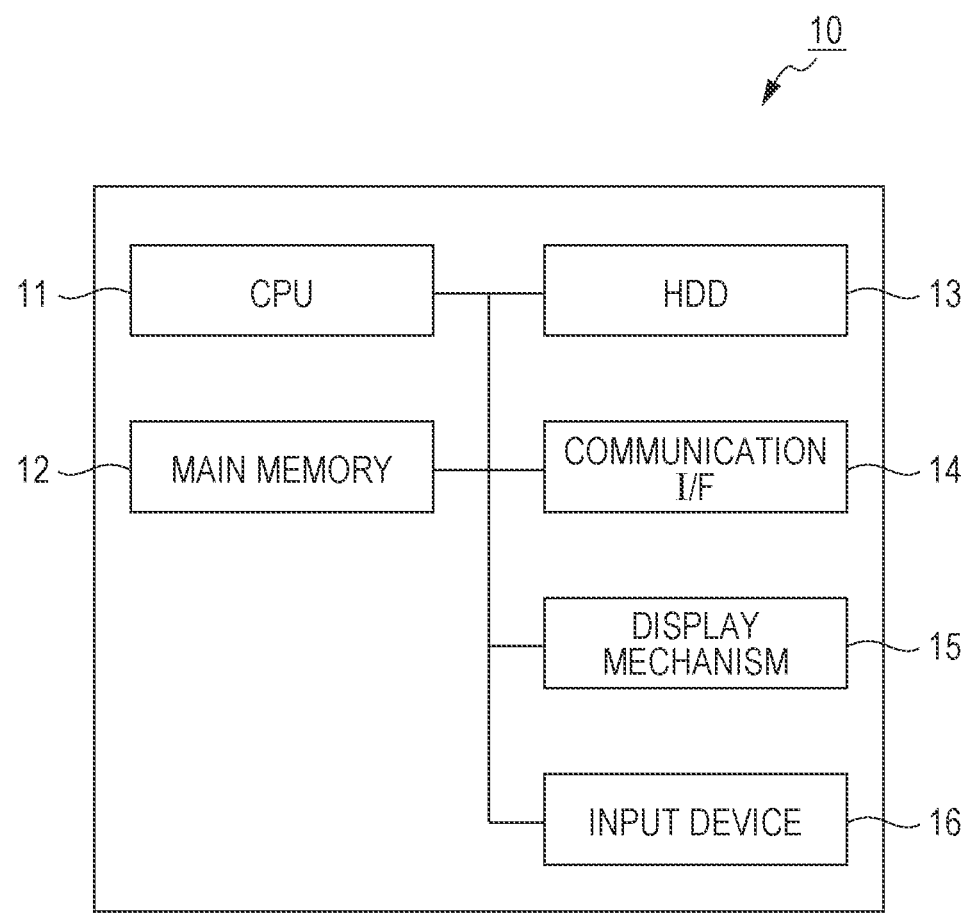
FIG. 2 is a diagram illustrating an example hardware configuration of a client terminal according to the exemplary embodiment.

FIG. 2 is a diagram illustrating an example hardware configuration of the client terminal 10.

As illustrated in FIG. 2, the client terminal 10 includes a central processing unit (CPU) 11 serving as a processor, a main memory 12 serving as a storage unit, and a hard disk drive (HDD) 13 serving as a storage unit. Here, the CPU 11 executes an operating system (OS) and various types of software such as applications, thereby realizing the various functions described below. The main memory 12 is a storage region that stores the various types of software and the data used for executing the software. The HDD 13 is a storage region that stores data input for the various types of software and data output from the various types of software. When the client terminal 10 is a smart phone or a mobile phone, a flash storage may be used instead of the HDD 13.

The client terminal 10 further includes a communication interface (hereinafter referred to as a communication I/F) 14 used for communicating with an external apparatus, a display mechanism 15 including a video memory and a display, and an input device 16 including a keyboard and a mouse.

FIG. 2 may be regarded as a diagram illustrating a hardware configuration of the document server 30. In this case, the CPU 11, the main memory 12, the HDD 13, the communication I/F 14, the display mechanism 15, and the input device 16 are replaced by a CPU 31, a main memory 32, an HDD 33, a communication I/F 34, a display mechanism 35, and an input device 36, respectively.

In the computer system illustrated in FIG. 1, a user uses an application in the client terminal 10 when performing editing, viewing, etc. on a document file. The application provides a user interface (UI) for performing viewing, editing, etc. In general, a display state of the UI (hereinafter referred to as a "UI state") may be freely set by the user. For example, in the case of using the UI as a menu for selecting a function to be used for viewing, editing, etc., displaying all items of all menus may hinder viewing of a document. Thus, the user is allowed to set a UI state, for example, a state in which a specific menu is not displayed, or a state in which a specific item of a specific menu is not displayed.

However, a single UI state may be set to a single application in typical cases. Thus, it may be impossible to store UI states for individual document files in accordance with the document files and the characteristics of jobs that are being performed.

Therefore, a UI state which is set during a job performed on a certain document file is lost upon the document file being closed, and thus the user needs to newly set a UI state which is suitable for the job after opening the document file next time.

When the client terminals 10a and 10b are different types of apparatuses, for example, a PC and a smart phone, the jobs actually performed by a user on the same document file using the client terminals 10a and 10b may be partially different from each other due to a difference in screen size or processing characteristics. In such a case, when a UI state stored in the client terminal 10a is to be reproduced in the client terminal 10b, simply reproducing the same UI state is insufficient.

In this exemplary embodiment, a UI state which is set during a job performed on a certain document file is stored in association with the document file, so that the same UI state may be reproduced when re-opening the document file after once closing the document file.

Also, a UI state may be reproduced by changing it in accordance with the type of apparatus with which a job is performed on a document file.

The former is defined as a first exemplary embodiment, and the latter is defined as a second exemplary embodiment, and the details thereof will be described below.

First Exemplary Embodiment

Figure 3:
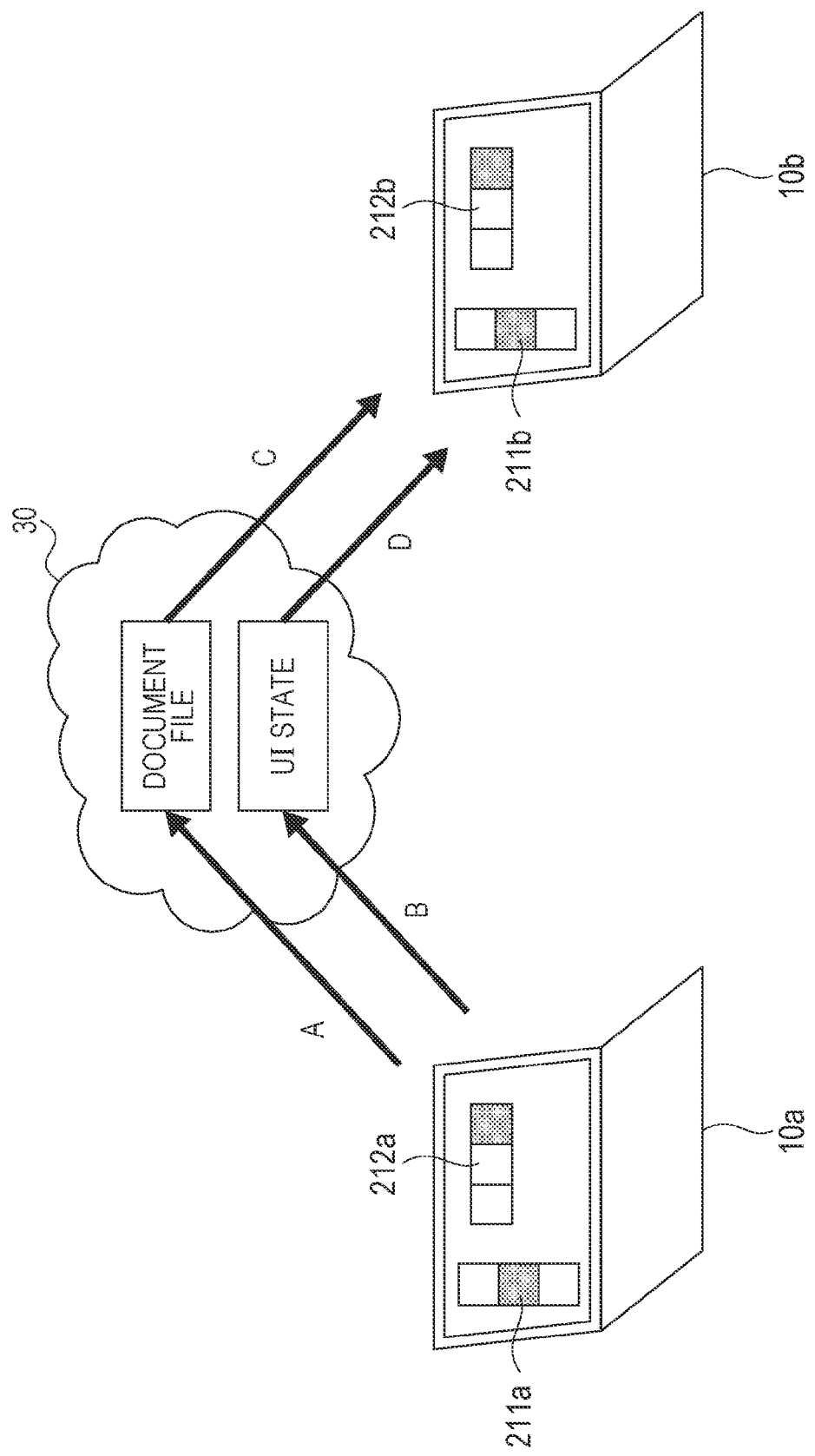
FIG. 3 is a diagram schematically illustrating an outline of a first exemplary embodiment of the present invention.

FIG. 3 is a diagram schematically illustrating an outline of the first exemplary embodiment. Here, it is assumed that a user performs viewing, editing, etc. by using the client terminal 10b, which is a PC, on a document file created by using the client terminal 10a, which is a PC.

First, the user stores a document file, which had been edited by using the client terminal 10a, in the document server 30 as indicated by arrow A. Then, the UI state at the time is also stored in the document server 30 as indicated by arrow B.

Subsequently, the same user retrieves the same document file from the document server 30 as indicated by arrow C and opens the document file by using the client terminal 10b. Then, the stored UI state is retrieved from the document server 30 as indicated by arrow D, and thereby the user is capable of performing a job by using the client terminal 10b in the same UI state as that in the client terminal 10a.

Specifically, assuming that menus 211a and 212a had been displayed on the screen of the client terminal 10a, menus 211b and 212b are displayed on the screen of the client terminal 10b in the same state.

Next, the configuration of the individual apparatuses according to this exemplary embodiment will be described.

Figure 4:
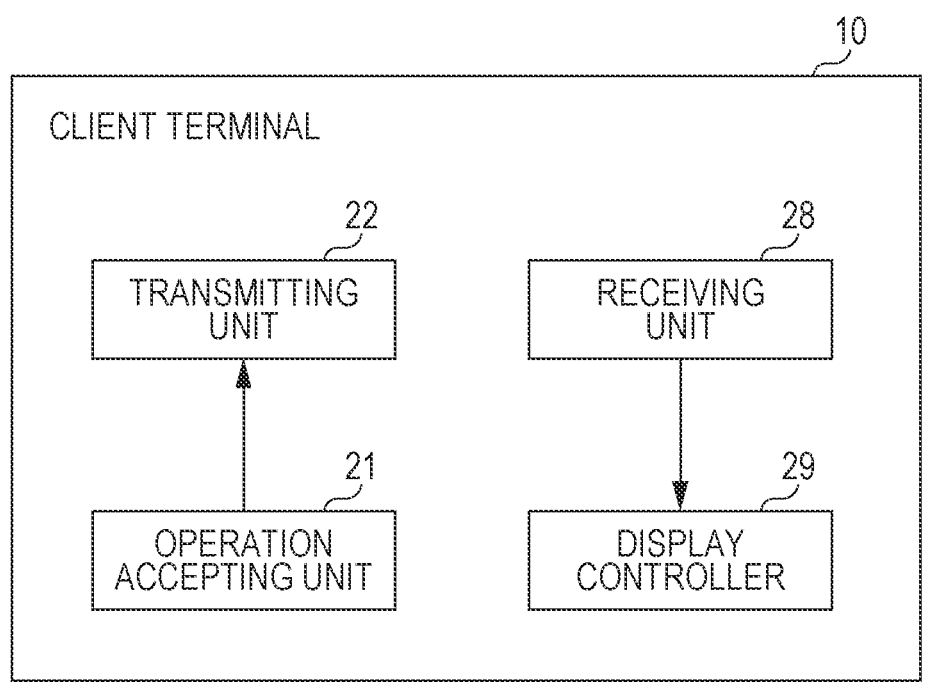
FIG. 4 is a block diagram illustrating an example functional configuration of a client terminal according to the first exemplary embodiment.

FIG. 4 is a block diagram illustrating an example functional configuration of the client terminal 10.

As illustrated in FIG. 4, the client terminal 10 includes an operation accepting unit 21, a transmitting unit 22, a receiving unit 28, and a display controller 29.

The operation accepting unit 21 accepts, from a user, an operation of logging into the document server 30, an operation of selecting a document file to be viewed or edited, an operation of storing a document file which has been received from the document server 30 and which has been viewed or edited, etc.

The transmitting unit 22 transmits, to the document server 30, identification information of a user (hereinafter referred to as a "user ID") when the operation accepting unit 21 accepts an operation of logging into the document server 30 from the user, identification information of a document file (hereinafter referred to as a "document ID") when the operation accepting unit 21 accepts an operation of selecting the document file from a user, and a document file, a document ID of the document file, and information representing a UI state (hereinafter simply referred to as a "UI state") when the operation accepting unit 21 accepts an operation of storing the document file in the document server 30 from a user. Here, an example of a document ID may be information indicating a storage site of a document file in the document server 30. The information indicating a storage site may be, for example, a uniform resource identifier (URI). In this exemplary embodiment, a document file is used as an example of data. A document ID is used as an example of first identification information identifying data. A user ID is used as an example of second identification information identifying an operator. A UI state is used as an example of state information representing a display state of an operation unit. The transmitting unit 22 is provided as an example of a first transmitting unit that transmits data, first identification information, second identification information, and state information when a storage operation is performed by an operator, and a second transmitting unit that transmits first identification information and second identification information when a reproduction operation is performed by an operator.

The receiving unit 28 receives, from the document server 30, a list of document IDs of document files that may be viewed or edited by a user when the transmitting unit 22 transmits the user ID of the user, and a document file stored in the site indicated by a document ID and a UI state for the document file when the transmitting unit 22 transmits the document ID.

The display controller 29 performs control so that a list of document IDs, a document file, a UI based on a UI state, and so forth received by the receiving unit 28 are displayed on the display mechanism 15.

These functional units are achieved when software and hardware resources operate in cooperation with each other. Specifically, these functional units are achieved when the CPU 11 reads a program for achieving the operation accepting unit 21, the transmitting unit 22, the receiving unit 28, and the display controller 29 from the HDD 13 to the main memory 12, and then executes the program.

Figure 5:
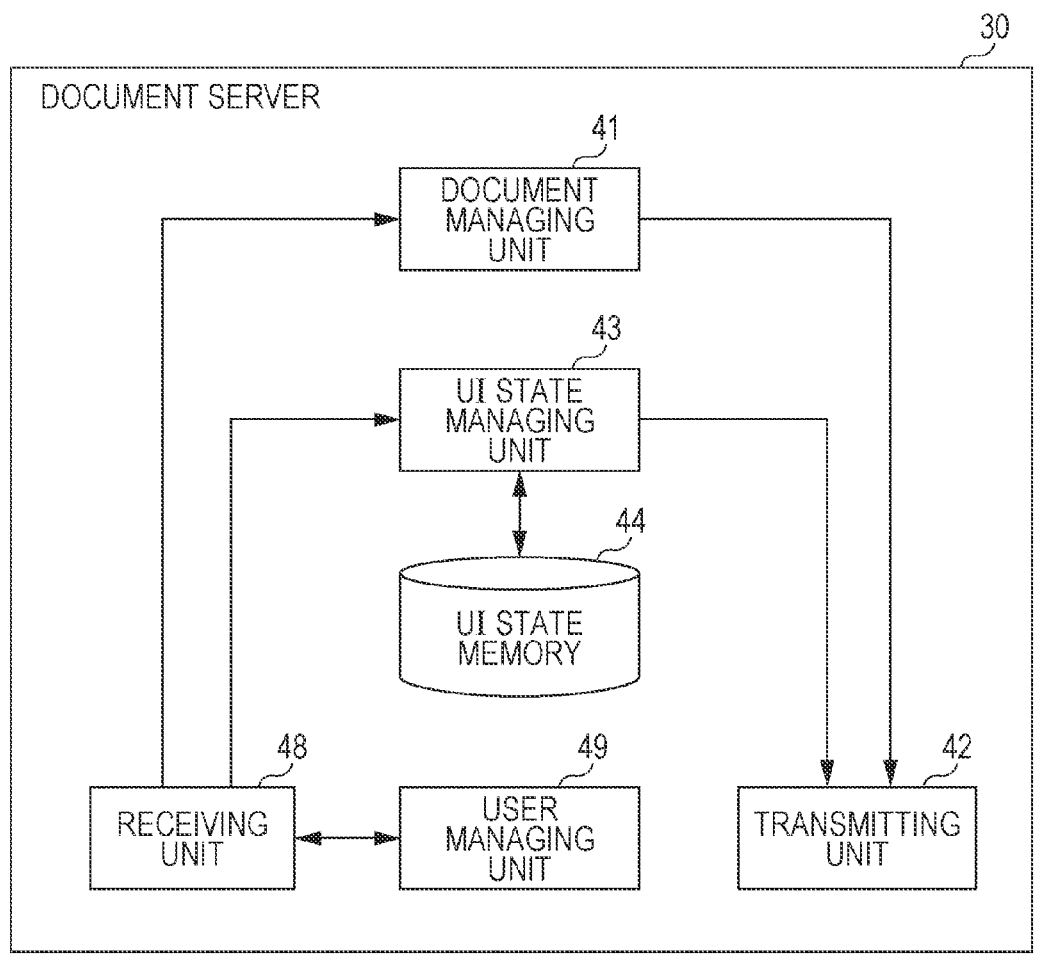
FIG. 5 is a block diagram illustrating an example functional configuration of a document server according to the first exemplary embodiment.

FIG. 5 is a block diagram illustrating an example functional configuration of the document server 30.

As illustrated in FIG. 5, the document server 30 includes a document managing unit 41, a transmitting unit 42, a UI state managing unit 43, a UI state memory 44, a receiving unit 48, and a user managing unit 49.

The document managing unit 41 manages a document file in a storage site, which is indicated by a document ID, of a document memory (not illustrated). That is, the document managing unit 41 obtains a document file from the document memory or stores a document file in the document memory. Also, the document managing unit 41 manages a document file by associating the document file with a user who is allowed to perform viewing, editing, etc. on the document file. For example, the document managing unit 41 associates user IDs with document IDs, and thereby obtains a document ID of a document file on which a certain user is allowed to perform viewing, editing, etc. In this exemplary embodiment, the document managing unit 41 is provided as an example of a memory that stores data when the data, first identification information, second identification information, and state information are transmitted by the first transmitting unit.

The transmitting unit 42 transmits, to the client terminal 10, a list of document IDs when the document managing unit 41 obtains the list of document IDs of document files on which a user is allowed to perform viewing, editing, etc., and a document file and a UI state for the document file when the document managing unit 41 obtains the document file. In this exemplary embodiment, the transmitting unit 42 is provided as an example of a processing unit that performs a process of displaying an operation unit when a reproduction operation is performed by an operator, and a third transmitting unit that transmits data and state information when first identification information and second identification information are transmitted by the second transmitting unit.

The UI state managing unit 43 manages, in the UI state memory 44, a UI state at a time when a user performs an operation of storing a document file in the document server 30 after viewing or editing the document file, in association with the document ID of the document file and the user ID of the user. That is, the UI state managing unit 43 obtains a UI state from the UI state memory 44 by using a document ID and a user ID as a key, and stores a UI state in the UI state memory 44 in association with a document ID and a user ID. In this exemplary embodiment, the UI state managing unit 43 is provided as an example of a processing unit that performs a process of storing state information when a storage operation is performed by an operator.

The UI state memory 44 stores a UI state in association with a document ID and a user ID, under the management performed by the UI state managing unit 43. In this exemplary embodiment, the UI state memory 44 is provided as an example of a memory that stores state information when data, first identification information, second identification information, and state information are transmitted by the first transmitting unit. The detailed content of the information stored in the UI state memory 44 will be described below.

The receiving unit 48 receives, from the client terminal 10, a user ID when a user performs an operation of logging into the document server 30, a document ID of a document file when a user performs an operation of selecting the document file, and a document file, a document ID of the document file, and a UI state when a user performs an operation of storing the document file in the document server 30. In this exemplary embodiment, the receiving unit 48 is provided as an example of a specifying unit that specifies data and a data obtaining unit that obtains data. Also, a user ID is used as an example of identification information identifying an operator, and the receiving unit 48 is provided as an example of an identification information obtaining unit that obtains identification information. Furthermore, the receiving unit 48 is provided as an example of a state information obtaining unit that obtains state information. Furthermore, the receiving unit 48 is provided as an example of a display setting obtaining unit that obtains setting about display of the operation unit.

The user managing unit 49 manages a user ID received by the receiving unit 48. That is, when a user logs into the document server 30, the receiving unit 48 receives a password in addition to a user ID. The user managing unit 49 performs user authentication by determining whether or not a set of the user ID and the password exists among sets of a user ID and a password that are registered in advance. If the user authentication is successfully performed, the user managing unit 49 generates a session ID, and associates the session ID with the user ID. After that, when the receiving unit 48 receives information, which includes the session ID, in a state where the login status of the user continues, the user managing unit 49 transmits the user ID associated with the session ID to the receiving unit 48.

These functional units are achieved when software and hardware resources operate in cooperation with each other. Specifically, these functional units are achieved when the CPU 31 reads a program for achieving the document managing unit 41, the transmitting unit 42, the UI state managing unit 43, the receiving unit 48, and the user managing unit 49 from the HDD 33 to the memory 32, and executes the program. The UI state memory 44 is achieved by, for example, the HDD 33.

FIG. 6 is a diagram illustrating an example of the detailed content of the information stored in the UI state memory 44.

As illustrated in FIG. 6, UI states are stored in the UI state memory 44 in association with individual document IDs and individual user IDs. For example, M1 is stored as a UI state which is stored when user A opens document file X, and M5 is stored as a UI state which is stored when user B opens document file Y.

In FIG. 6, UI states are represented by symbols, such as M1, M2, etc. Actually, settings are stored which define whether or not individual menus are to be displayed, where the individual menus are to be displayed, which of a horizontally-long bar and a vertically-long bar is to be used for displaying menus, whether or not individual items of the individual menus are to be displayed, which arrangement is used when displaying the individual items of the individual menus, etc. Alternatively, such settings may be stored in a separate place, and a link to the settings may be stored in the UI state memory 44.

Next, operation according to this exemplary embodiment will be described. In the outline illustrated in FIG. 3, the client terminal 10*a* stores a UI state in the document server 30, and the client terminal 10*b* retrieves the UI state from the document server 30. Here, description will be given of a case where the document server 30 transmits a UI state to the client terminal 10 and receives a changed UI state from the client terminal 10.

Figure 7:
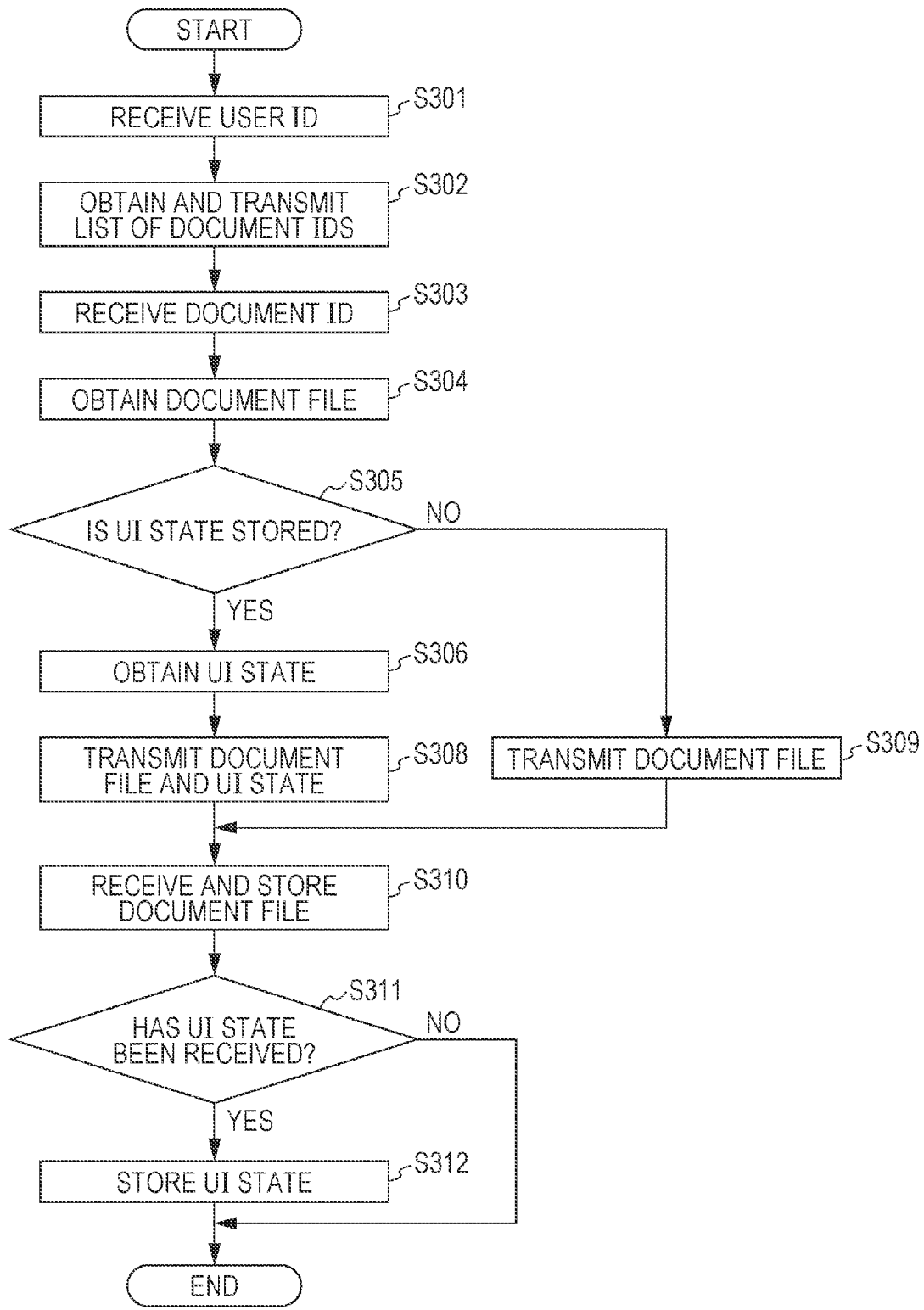
FIG. 7 is a flowchart illustrating an example of operation of the document server according to the first exemplary embodiment.

FIG. 7 is a flowchart illustrating an example of operation of the document server 30. The operation illustrated in this flowchart starts when the operation accepting unit 21 of the client terminal 10 accepts an operation of logging into the document server 30 and then the transmitting unit 22 of the client terminal 10 transmits a user ID to the document server 30.

Upon the operation being started, the receiving unit 48 of the document server 30 receives a user ID in step S301. The user ID is managed by the user managing unit 49, and a subsequent access from the same user is recognizable as long as a login status continues.

The receiving unit 48 transmits the user ID to the document managing unit 41. Accordingly, the document managing unit 41 obtains a list of document IDs of document files associated with the user ID, and the transmitting unit 42 transmits the list of document IDs to the client terminal 10 in step S302. Accordingly, in the client terminal 10, the receiving unit 28 receives the list of document IDs, and the display controller 29 performs control so that the list of document IDs is displayed.

Subsequently, in the client terminal 10, the operation accepting unit 21 accepts an operation of selecting, from the list of document IDs, a document ID of a document file on which viewing, editing, etc. are to be performed, and the transmitting unit 22 transmits the selected document ID to the document server 30. Accordingly, in the document server 30, the receiving unit 48 receives the document ID in step S303.

Subsequently, the receiving unit 48 transmits the document ID to the document managing unit 41, and the document managing unit 41 obtains the document file which is stored in the site indicated by the document ID in step S304. The document file obtained here is transmitted to the transmitting unit 42.

Also, the receiving unit 48 transmits, in addition to the document ID, the user ID managed by the user managing unit 49 to the UI state managing unit 43. Accordingly, the UI state managing unit 43 determines in step S305 whether or not the UI state associated with the document ID and the user ID is stored in the UI state memory 44.

If the UI state managing unit 43 determines that the UI state associated with the document ID and the user ID is stored in the UI state memory 44, the UI state managing unit 43 obtains the UI state in step S306. The UI state obtained here is transmitted to the transmitting unit 42.

Accordingly, the transmitting unit 42 transmits the document file received from the document managing unit 41 and the UI state received from the UI state managing unit 43 to the client terminal 10 in step S308. Accordingly, in the client terminal 10, the receiving unit 28 receives the document file and the UI state, and the display controller 29 performs control so that the document file is displayed and so that a UI for viewing and editing the document file is displayed in the UI state.

If the UI state managing unit 43 determines that the UI state associated with the document ID and the user ID is not stored in the UI state memory 44, the UI state managing unit 43 notifies the transmitting unit 42 of that fact, and the transmitting unit 42 transmits only the document file received from the document managing unit 41 to the client terminal 10 in step S309. Accordingly, in the client terminal 10, the receiving unit 28 receives the document file, and the display controller 29 performs control so that the document file is displayed. At this time, a default UI state prepared for an application of performing viewing, editing, etc. on a document file is used.

After that, in the client terminal 10, viewing, editing, etc. are performed on the document file, the operation accepting unit 21 accepts an operation of storing the document file in the document server 30 from the user, and the transmitting unit 22 transmits the document ID and the document file to the document server 30. If a UI state has been received from the document server 30 and if the UI state has been changed during viewing, editing, etc. of the document file, the transmitting unit 22 also transmits the UI state to the document server 30. Accordingly, in the document server 30, the receiving unit 48 receives the document ID and the document file and transmits them to the document managing unit 41, and the document managing unit 41 stores the document file in the site indicated by the document ID in step S310.

Also, the receiving unit 48 determines in step S311 whether or not a UI state has been received together with the document ID and the document file.

If the UI state has been received, the receiving unit 48 transmits the document ID, the UI state, and the user ID which is managed by the user managing unit 49 to the UI state managing unit 43. The UI state managing unit 43 stores the UI state in the UI state memory 44 in association with the document ID and the user ID in step S312. Then, the process ends.

If the UI state has not been received, the process ends.

In this example operation, the user logs into the document server 30 to retrieve a UI state, updates the UI state in the client terminal 10, and stores the updated UI state in the document server 30 while maintaining a login status.

Alternatively, the user may log into the document server 30 to retrieve a UI state, log out, update the UI state using the client terminal 10, and log into the document server 30 again at a certain timing to store the updated UI state therein. In this case, the flowchart may be changed so that the process ends after steps S301 to S309 have been performed, step S301 is performed as an independent process, and then steps S310 to S312 are performed.

Alternatively, instead of logging into the document server 30 to retrieve a UI state, the user may store a UI state that has been newly set in the client terminal 10 in the document server 30 by logging into the document server 30. In this case, the flowchart may be changed so that steps S301 to S309 are not performed, but step S301 is performed and then steps S310 to S312 are performed.

This is the end of the description of the first exemplary embodiment.

Second Exemplary Embodiment

Figure 8:
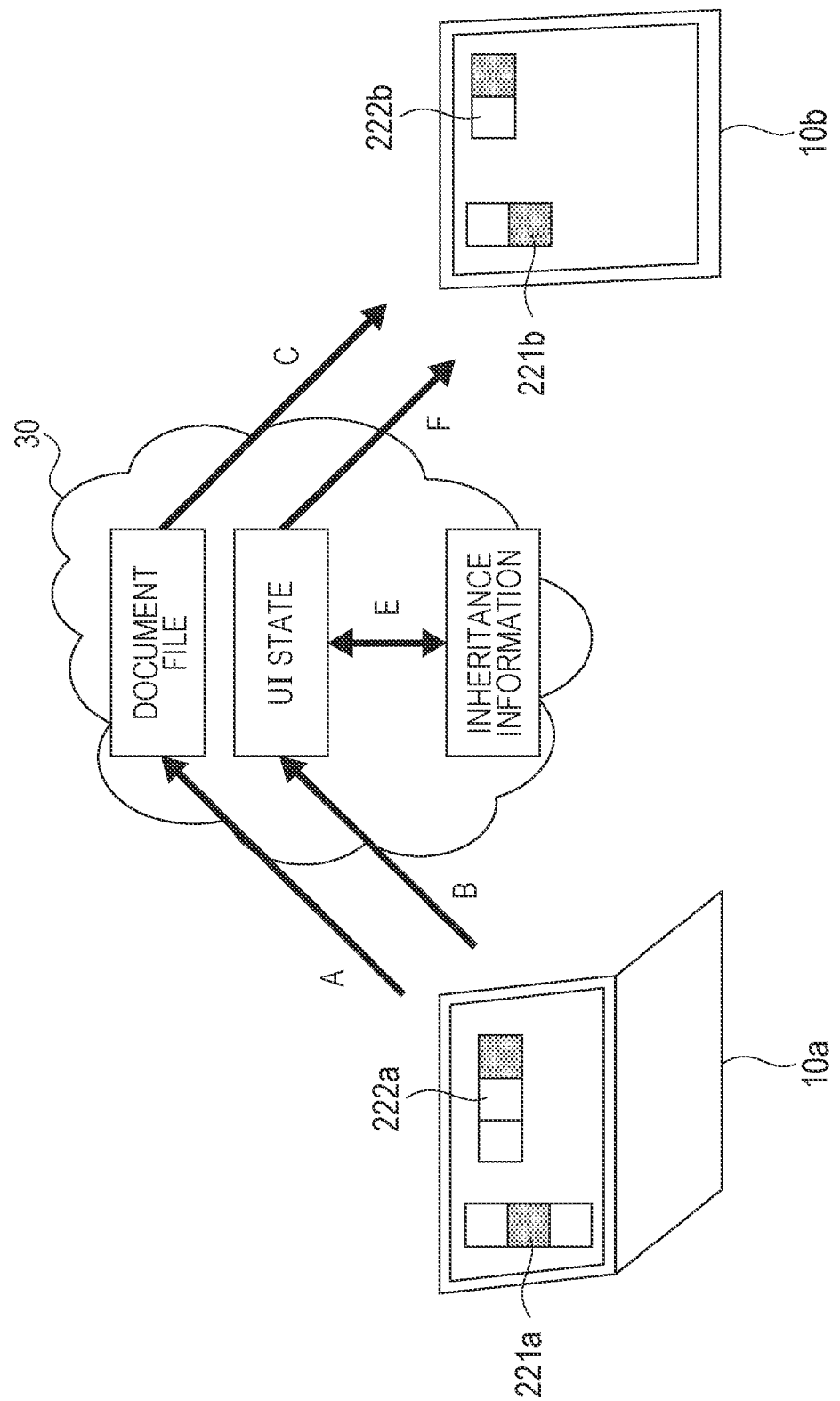
FIG. 8 is a diagram schematically illustrating an outline of a second exemplary embodiment of the present invention.

FIG. 8 is a diagram schematically illustrating an outline of the second exemplary embodiment. Here, it is assumed that a user performs viewing, editing, etc. by using the client terminal 10b, which is a smart phone, on a document file created by using the client terminal 10a, which is a PC.

First, the user stores a document file, which had been edited by using the client terminal 10a, in the document server 30 as indicated by arrow A. Then, the UI state at the time is also stored in the document server 30 as indicated by arrow B.

Subsequently, the same user retrieves the same document file from the document server 30 as indicated by arrow C and opens the document file by using the client terminal 10b. Then, a UI state is inherited from the UI state stored in the document server 30 in accordance with inheritance information as indicated by arrow E, the inherited UI state is retrieved from the document server 30 as indicated by arrow F, and a UI is displayed on the client terminal 10b in the inherited UI state.

Specifically, assuming that menus 221a and 222a, each having three items, had been displayed on the screen of the client terminal 10a, menus 221b and 222b, each having items the number of which is smaller than that in the menu 221a or 222a by one, are displayed on the screen of the client terminal 10b.

Next, the configuration of the individual apparatuses according to this exemplary embodiment will be described. The configuration of the client terminal 10 has been described in the first exemplary embodiment, and thus only the configuration of the document server 30 will be described below.

Figure 9:
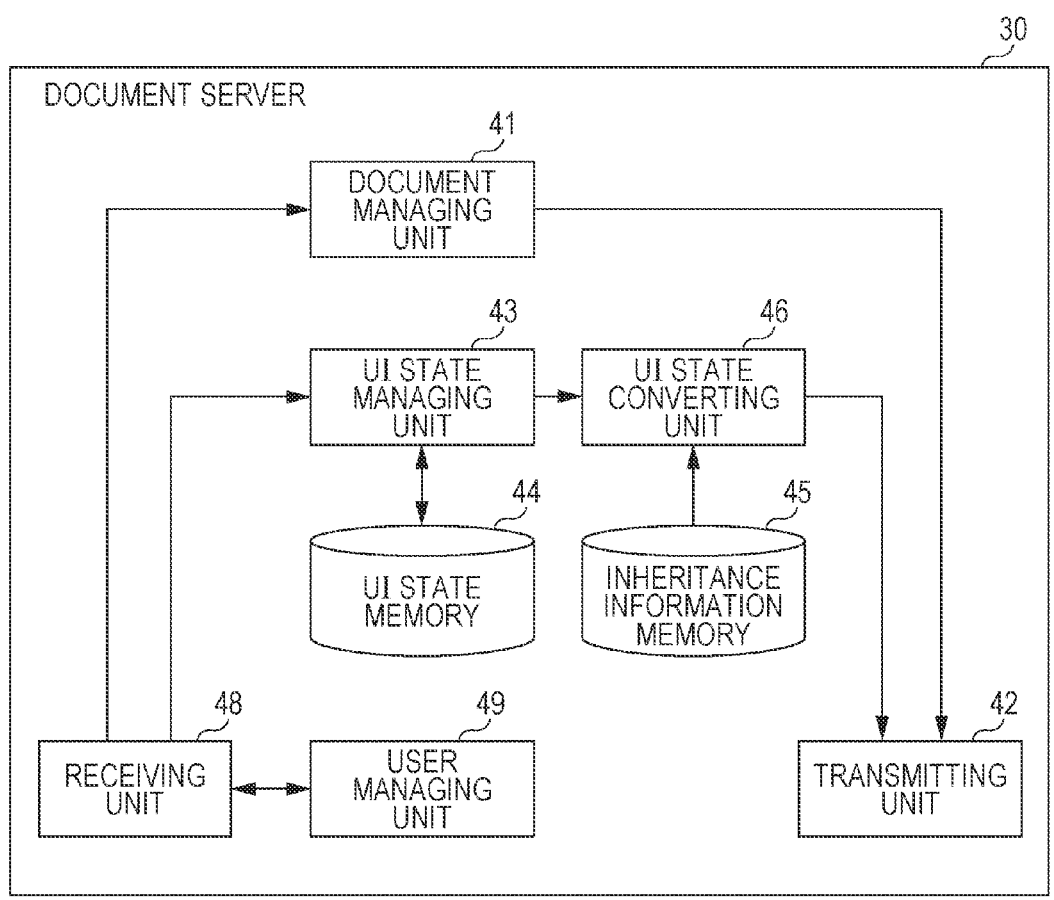
FIG. 9 is a block diagram illustrating an example functional configuration of a document server according to the second exemplary embodiment.

FIG. 9 is a block diagram illustrating an example functional configuration of the document server 30.

As illustrated in FIG. 9, the document server 30 includes the document managing unit 41, the transmitting unit 42, the UI state managing unit 43, the UI state memory 44, an inheritance information memory 45, a UI state converting unit 46, the receiving unit 48, and the user managing unit 49. The document managing unit 41, the transmitting unit 42, the UI state managing unit 43, the UI state memory 44, the receiving unit 48, and the user managing unit 49 have been described in the first exemplary embodiment, and thus only the inheritance information memory 45 and the UI state converting unit 46 will be described below.

The inheritance information memory 45 stores information defining the setting and state for sharing a UI state among the client terminals 10 (hereinafter referred to as "inheritance information"). The detailed content of the information stored in the inheritance information memory 45 will be described below.

The UI state converting unit 46 converts, when the UI state managing unit 43 obtains a UI state from the UI state memory 44 by using a document ID and a user ID as a key, the UI state in accordance with the inheritance information stored in the inheritance information memory 45 and the information indicating the type of client terminal 10 as a transmitter (hereinafter referred to as "terminal type information").

These functional units are achieved when software and hardware resources operate in cooperation with each other. Specifically, these functional units are achieved when the CPU 31 reads a program for achieving the document managing unit 41, the transmitting unit 42, the UI state managing unit 43, the UI state converting unit 46, the receiving unit 48, and the user managing unit 49 from the HDD 33 to the main memory 32, and then executes the program. The UI state memory 44 and the inheritance information memory 45 are achieved by, for example, the HDD 33.

FIGS. 10A and 10B are diagrams illustrating the detailed content of the information stored in the inheritance information memory 45. FIG. 10A illustrates inheritance information regarding menus. In this exemplary embodiment, a menu is used as an example of an operation unit.

As illustrated in FIG. 10A, the inheritance information regarding menus includes information indicating "display" or "hide" ("display/hide" field) and information indicating the form of display ("form" field) for individual menus and individual apparatuses. In the "form" field, "default" represents employing a default form (for example, a horizontally-long bar) as a form of the menu, and "apparatus" represents employing a form suitable for the apparatus (for example, a form suitable for the form of a screen) as a form of the menu.

In FIG. 10A, it is assumed that apparatus A is a PC and apparatus B is a smart phone. That is, the screen of apparatus B is smaller than the screen of apparatus A. Thus, setting is performed so that a draw menu is displayed in apparatus A but is not displayed in apparatus B. Also, setting is performed so that the forms of a character format menu and a ruled line menu are default forms in apparatus A but are forms suitable for the apparatus in apparatus B. Accordingly, if apparatus B is capable of changing the orientation of its screen, a vertically-long menu is displayed when the screen is oriented in a portrait orientation, and a horizontally-long menu is displayed when the screen is oriented in a landscape orientation.

In FIG. 10A, which of a default form or a form suitable for an apparatus is to be used is defined only for the form of menus. Alternatively, such definition may be set for the display position of menus.

FIG. 10B illustrates inheritance information regarding items of menus. In this exemplary embodiment, items of a menu are used as an example of operation items.

As illustrated in FIG. 10B, the inheritance information regarding items of menus includes information indicating "display" or "hide" ("display/hide" field) and information indicating the order in which the items are arranged ("order" field) for individual items of menus and individual apparatuses. Here, "order" means the order in which items are arranged in a menu. The order varies depending on the form of a menu. When a menu has a horizontally-long bar form, the order is 1, 2, 3, . . . from the left. When a menu has a vertically-long bar form, the order is 1, 2, 3, . . . from the top. These are merely examples, and order may be set so that a user may easily select an item.

In FIG. 10B, it is assumed that apparatus A is a PC and apparatus B is a smart phone. That is, the screen of apparatus B is smaller than the screen of apparatus A. Thus, regarding the character format menu, for example, setting is performed so that all the items "font", "font size", "bold", "italic", and "underline" are displayed in apparatus A, but that the items "bold", "italic", and "underline" related to detailed editing of text are not displayed in apparatus B. Regarding the character format menu, for example, setting is performed so that the item "font" comes before the item "font size" in apparatus A, but that the item "font size" comes before the item "font" in apparatus B. For example, definition may be set so that an item that is often used in an operation that is often performed in apparatus B comes before an item that is less often used.

The inheritance information illustrated in FIGS. 10A and 10B defines the display states in two apparatuses. The inheritance information may be further fragmented, and the display states in three or more apparatuses may be defined.

Next, operation according to this exemplary embodiment will be described. In the outline illustrated in FIG. 8, the client terminal 10a stores a UI state in the document server 30, and the client terminal 10b retrieves the UI state from the document server 30. Hereinafter, description will be given of a case where the document server 30 transmits a UI state to the client terminal 10 and receives a changed UI state from the client terminal 10.

FIG. 11 is a flowchart illustrating an example of operation of the document server 30. The operation illustrated in this flowchart starts when the operation accepting unit 21 of the client terminal 10 accepts an operation of logging into the document server 30 and then the transmitting unit 22 of the client terminal 10 transmits a user ID to the document server 30.

Upon the operation being started, steps S351 to S354 are performed in the document server 30. These steps are the same as steps S301 to S304 illustrated in FIG. 7, and the description thereof is omitted.

In step S354, the document managing unit 41 obtains a document file and transmits it to the transmitting unit 42. Then, the receiving unit 48 transmits the document ID received from the client terminal 10 and the user ID managed by the user managing unit 49 to the UI state managing unit 43. Accordingly, the UI state managing unit 43 determines in step S355 whether or not the UI state associated with the document ID and the user ID is stored in the UI state memory 44.

If the UI state managing unit 43 determines that the UI state associated with the document ID and the user ID is stored in the UI state memory 44, the UI state managing unit 43 obtains the UI state in step S356.

Subsequently, in step S357, the UI state converting unit 46 converts the UI state in accordance with the inheritance information stored in the inheritance information memory 45 and the terminal type information regarding the client terminal 10. Although description of the terminal type information has not been given, it is assumed that the terminal type information is included in the information that is transmitted from the client terminal 10 to the document server 30. That is, in step S353, the receiving unit 48 receives terminal type information in addition to the document ID. The terminal type information is information capable of specifying the client terminal 10 or the screen thereof. Thus, the terminal type information is an example of characteristic information representing the characteristic of a display screen or an apparatus having a display screen, and the receiving unit 48 is an example of a characteristic information obtaining unit that obtains characteristic information. The receiving unit 48 transmits the terminal type information to the UI state converting unit 46, and the UI state converting unit 46 converts the UI state. For example, it is assumed that the UI state is a state in which a character format menu including the items "font", "font size", and "bold" in this order and a draw menu are displayed, the inheritance information illustrated in FIGS. 10A and 10B is stored in the inheritance information memory 45, and the terminal type information of the client terminal 10 represents apparatus B illustrated in FIGS. 10A and 10B. In this case, the UI state is converted to a UI state that includes the items "font size" and "font" in this order, that includes a character format menu having a form suitable for the apparatus, and that does not include a draw menu. The UI state converted here is transmitted to the transmitting unit 42.

Accordingly, the transmitting unit 42 transmits the document file received from the document managing unit 41 and the UI state received from the UI state converting unit 46 to the client terminal 10 in step S358. Accordingly, in the client terminal 10, the receiving unit 28 receives the document file and the UI state, and the display controller 29 performs control so that the document file is displayed and that a UI used for performing viewing, editing, etc. on the document file is displayed in this UI state.

If the UI state managing unit 43 determines that the UI state associated with the document ID and the user ID is not stored in the UI state memory 44, the UI state managing unit 43 notifies the transmitting unit 42 of that fact. Accordingly, the transmitting unit 42 transmits only the document file received from the document managing unit 41 to the client terminal 10 in step S359. Accordingly, in the client terminal 10, the receiving unit 28 receives the document file, and the display controller 29 performs control so that the document file is displayed. At this time, a default UI state that is prepared for an application of performing viewing, editing, etc. on a document file is used.

After that, viewing, editing, etc. of the document file are performed in the client terminal 10, and steps S361 and S362 are performed in the document server 30. These steps are the same as steps S311 and S312 illustrated in FIG. 7, and thus the description thereof is omitted.

In the above-described example operation, the user logs into the document server 30 to retrieve a UI state, and stores the UI state that has been updated in the client terminal 10 in the document server 30 while maintaining a login status. Alternatively, the user may log into the document server 30 to retrieve a UI state, log out, update the UI state using the client terminal 10, and log into the document server 30 again at a certain timing to store the updated UI state therein. In this case, the flowchart may be changed so that the process ends after steps S351 to S359 have been performed, step S351 is performed as an independent process, and then steps S360 to S362 are performed.

Instead of logging into the document server 30 to retrieve a UI state, the user may store a UI state that has been newly set in the client terminal 10 in the document server 30 by logging into the document server 30. In this case, the flowchart may be changed so that steps S351 to S359 are not performed, but step S351 is performed and then steps S360 to S362 are performed.

This is the end of the description of the second exemplary embodiment.

In the above-described exemplary embodiments, the client terminal 10 stores a UI state in the document server 30 when storing a document file in the document server 30. Alternatively, the client terminal 10 may store a UI state in the document server 30 in response to an explicit instruction, not when storing a document file in the document server 30. For example, the client terminal 10 may store a UI state in the document server 30 together with a document file upon pressing of a button for storing the document file. Alternatively, a special button for storing a UI state may be provided, and the client terminal 10 may store only a UI state in the document server 30 upon pressing of the special button. Alternatively, the client terminal 10 may store a UI state in the document server 30 upon a predetermined storage operation being performed by a user as an operation of storing the UI state.

In the above-described exemplary embodiments, the client terminal 10 retrieves a UI state from the document server 30 when retrieving a document file from the document server 30. Alternatively, the client terminal 10 may retrieve a UI state from the document server 30 in response to an explicit instruction, not when retrieving a document file from the document server 30. For example, the client terminal 10 may retrieve a UI state from the document server 30 together with a document file upon pressing of a button for retrieving the document file. Alternatively, a special button for retrieving a UI state may be provided, and the client terminal 10 may retrieve only a UI state from the document server 30 upon pressing of the special button. Alternatively, the client terminal 10 may retrieve a UI state from the document server 30 upon a predetermined reproduction operation being performed by a user as an operation of reproducing the UI state.

In the above-described exemplary embodiments, the document server 30 stores a UI state as a file separated from a document file, and stores information for associating the UI state with a document ID and a user ID, thereby associating the document file with the UI state. Alternatively, for example, the document server 30 may associate a document file, a user, and a UI state by adding the user ID and UI state as attribute information to the document file.

In the above-described exemplary embodiments, the client terminal 10 transmits a document file, a user ID, and a UI state to the document server 30, and the document server 30 stores them in association with one another. Alternatively, for example, the client terminal 10 may transmit information for associating a document file, a user ID, and a UI state to the document server 30, and the document server 30 may store the information. Alternatively, the client terminal 10 may store information for associating a document file, a user ID, and a UI state. In this case, the client terminal 10 includes a document file specifying unit (not illustrated) as an example of a specifying unit that specifies a document file, a user ID obtaining unit (not illustrated) as an example of an identification information obtaining unit that obtains a user ID of a user who performs an operation on a document file, a UI state obtaining unit (not illustrated) as an example of a state information obtaining unit that obtains a UI state, a UI state storage unit (not illustrated) as an example of a processing unit that stores a UI state in association with a document file and a user ID upon a storage operation being performed by a user, and the display controller 29 as an example of a processing unit that displays a UI in a UI state that is stored in association with a document file and a user ID upon a reproduction operation being performed by a user.

A program for realizing the exemplary embodiments may be provided by being stored in a recording medium, such as a compact disc-read only memory (CD-ROM), as well as be provided through a communication medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a memory, and at least one microprocessor configured to:
    receive, from a first operation apparatus, when a storage operation of storing a UI state of at least one UI item, which is used for performing an operation on a document file displayed on a display screen of the first operation apparatus, is performed by an operator, the document file, document file identification information, operator identification information, and UI state information of the document file, the UI state information representing a UI state of the at least one UI item;
    receive, from a second operation apparatus, when a reproduction operation of reproducing a UI state of at least one UI item, which is used for performing an operation on the document file displayed on a display screen of the second operation apparatus, is performed by the operator, the document file information and the operation identification information;
    store, in the memory, the document file in association with the document file identification information, and store the UI state information in association with the document file identification information and the operator identification information when the document file, the document file identification information, the operator identification information, and the UI state information are received from the first operation apparatus, and
    transmit, when the document file identification information and the operator identification information are received from the second operation apparatus, the document file and the UI state information to the second operation apparatus so that the document file stored in the memory in association with the document file identification information is displayed on the display screen of the second operation apparatus, and so that the at least one UI item is displayed on the display screen of the second operation apparatus in the UI state represented by the UI state information stored in the memory in association with the document file identification information and the operator identification information.

2. The information processing apparatus according to claim 1,
    wherein the display screen of the first operation apparatus is different from the display screen of the second operation apparatus,
    the operator identification information received from the first operation apparatus identifies an operator who performs an operation on the document file on the display screen of the second operation apparatus, and
    the second operation apparatus performs, when a reproduction operation of reproducing a UI state is performed by the operator of the second operation apparatus, a process of displaying the document file in association with at least one UI item on the display screen of the second operation apparatus in the UI state represented by the UI state information stored in association with the document file and the operator identification information.

3. The information processing apparatus according to claim 2,
    wherein the at least one microprocessor is further configured to:
    obtain characteristic information representing a characteristic of the display screen of the second operation apparatus or a characteristic of the second operation apparatus, and
    the second operation apparatus performs, when the reproduction operation is performed by the operator, a process of displaying the at least one UI item on the display screen of the second operation apparatus in a new display state, which is obtained by performing, in accordance with the characteristic information, a conversion process on the UI state represented by the UI state information stored in association with the document file and the operator identification information.

4. The information processing apparatus according to claim 3,
wherein the conversion process is a process of reducing the number of UI items arranged in the UI state.

5. The information processing apparatus according to claim 3,
wherein the conversion process is a process of changing an order in which UI items are arranged in the UI state.

6. The information processing apparatus according to claim 3,
wherein the conversion process is a process of changing a display position or form of the at least one UI item.

7. The information processing apparatus according to claim 1,
wherein at least one microprocessor performs, when the storage operation is performed by the operator, a process of storing, in association with the document file and the document file identification information but separately from the document file, the UI state information.

8. The information processing apparatus according to claim 1, wherein the at least one microprocessor is further configured to:
obtain the document file displayed on the display screen of the first operation apparatus, and
perform a process of storing the document file such that the document file identification information and the UI state information are added to the document file.

9. An information processing system comprising:
a first operation apparatus configured to perform an operation on a document file;
a second operation apparatus configured to perform an operation on the document file; and
a management apparatus configured to manage the document file,
the first operation apparatus including at least one microprocessor configured to:
transmit, when a storage operation of storing a UI state of at least one UI item, which is used for performing an operation on the document file displayed on a display screen of the first operation apparatus, is performed by an operator, the document file, first identification information identifying the document file, second identification information identifying the operator, and UI state information of the document file, the UI state information representing a UI state of the at least one UI item,
the second operation apparatus including at least one microprocessor configured to:
transmit, when a reproduction operation of reproducing a UI state of at least one UI item, which is used for performing an operation on the document file displayed on a display screen of the second operation apparatus, is performed by the operator, the first identification information identifying the document file and the second identification information identifying the operator, and
the management apparatus including:
a memory configured to store the document file in association with the first identification information and store the UI state information in association with the first identification information and the second identification information when the document file, the first identification information, the second identification information, and the UI state information are transmitted by the first operation apparatus, and
at least one microprocessor configured to transmit, when the first identification information and the second identification information are transmitted by the second operation apparatus, the document file to the second operation apparatus so that the document file stored in the memory in association with the first identification information is displayed on the display screen of the second operation apparatus, and the UI state information to the second operation apparatus so that the at least one UI item is displayed on the display screen of the second operation apparatus in the UI state represented by the UI state information stored in the memory in association with the first identification information and the second identification information.

10. An information processing method comprising:
receiving, from a first operation apparatus, when a storage operation of storing a UI state of at least one UI item, which is used for performing an operation on a document file displayed on a display screen of the first operation apparatus, is performed by an operator, the document file, document file identification information, operator identification information, and UI state information of the document file, the UI state information representing a UI state of the at least one UI item;
receiving, from a second operation apparatus, when a reproduction operation of reproducing a UI state of at least one UI item, which is used for performing an operation on the document file displayed on a display screen of the second operation apparatus, is performed by the operator, the document file information and the operation identification information;
storing, in a memory, the document file in association with the document file identification information, and storing the UI state information in association with the document file identification information and the operator identification information when the document file, the document file identification information, the operator identification information, and the UI state information are received from the first operation apparatus, and
transmitting, when the document file identification information and the operator identification information are received from the second operation apparatus, the document file and the UI state information to the second operation apparatus so that the document file stored in the memory in association with the document file identification information is displayed on the display screen of the second operation apparatus, and so that the at least one UI item is displayed on the display screen of the second operation apparatus in the UI state represented by the UI state information stored in the memory in association with the document file identification information and the operator identification information.

11. A non-transitory computer readable medium storing a program causing a computer to execute a process, the process comprising:
receiving, from a first operation apparatus, when a storage operation of storing a UI state of at least one UI item, which is used for performing an operation on a document file displayed on a display screen of the first operation apparatus, is performed by an operator, the document file, document file identification information, operator identification information, and UI state information of the document file, the UI state information representing a UI state of the at least one UI item;

receiving, from a second operation apparatus, when a reproduction operation of reproducing a UI state of at least one UI item, which is used for performing an operation on the document file displayed on a display screen of the second operation apparatus, is performed by the operator, the document file information and the operation identification information;

storing, in a memory, the document file in association with the document file identification information, and storing the UI state information in association with the document file identification information and the operator identification information when the document file, the document file identification information, the operator identification information, and the UI state information are received from the first operation apparatus, and transmitting, when the document file identification information and the operator identification information are received from the second operation apparatus, the document file and the UI state information to the second operation apparatus so that the document file stored in the memory in association with the document file identification information is displayed on the display screen of the second operation apparatus, and so that the at least one UI item is displayed on the display screen of the second operation apparatus in the UI state represented by the UI state information stored in the memory in association with the document file identification information and the operator identification information.

12. A non-transitory computer readable medium storing a program causing a computer to execute a process, the process comprising:

receiving, from a first operation apparatus, when a storage operation of storing a UI state of at least one UI item, which is used for performing an operation on a document file displayed on a display screen of the first operation apparatus, is performed by an operator, the document file, document file identification information, operator identification information, and UI state information of the document file, the UI state information representing a UI state of the at least one UI item;

receiving, from a second operation apparatus, when a reproduction operation of reproducing a UI state of at least one UI item, which is used for performing an operation on the document file displayed on a display screen of the second operation apparatus, is performed by the operator, the document file information and the operation identification information;

storing, in a memory, when a storage operation of storing a UI state of the at least one UI item is performed by the operator of the first operation apparatus, the document file such that the document file identification information and the UI state information are added to the document file, and transmitting, when the document file identification information and the operator identification information are received from the second operation apparatus, the document file and the UI state information to the second operation apparatus so that the document file stored in the memory in association with the document file identification information is displayed on the display screen of the second operation apparatus, and so that the at least one UI item is displayed on the display screen of the second operation apparatus in the UI state represented by the UI state information stored in the memory in association with the document file identification information and the operator identification information.

13. The information processing apparatus according to claim 1, wherein the process of storing the UI state information comprises storing the position of the at least one UI item on the display, the order of the at least one UI item on the display, and information indicating whether a UI item of the at least one UI item is to be displayed, in association with the operator identification information and the document file identification information.

14. The information processing apparatus according to claim 1,
wherein at least one microprocessor is configured to:
perform, when a reproduction operation of reproducing a UI state of the at least one UI item is performed by the operator of the second operation apparatus, a process of displaying the at least one UI item on the display screen of the second operation apparatus in the UI state represented by the UI state information stored in association with the document file and the operator identification information, and
perform, when the reproduction operation is performed by the operator of the second operation apparatus, a process of displaying the at least one UI item on the display screen of the second operation apparatus in a new UI state, which is obtained by performing, in accordance with characteristic information, a conversion process on the UI state represented by the UI state information stored in association with the document file and the operator identification information, and
wherein the conversion process comprises performing at least one of a process of reducing the number of UI items arranged in the at least one UI item, a process of changing an order in which the at least one UI item are arranged in the UI, and a process of changing a display position or form of the at least one UI item.

15. The information processing apparatus according to claim 1, wherein the UI state information comprises a position of UI items on the display, an order of UI items on the display, and information indicating whether an item of the UI items is to be displayed.

* * * * *